(12) United States Patent
Lawcock et al.

(10) Patent No.: US 11,114,677 B2
(45) Date of Patent: Sep. 7, 2021

(54) FUEL CELL INTERCONNECTOR AND METHOD FOR MAKING A FUEL CELL INTERCONNECTOR

(71) Applicant: STACKPOLE INTERNATIONAL POWDER METAL, ULC, Ancaster (CA)

(72) Inventors: Roger Lawcock, Burlington (CA); Brendan Ayre, Waterdown (CA); Rohith Shivanath, Toronto (CA)

(73) Assignee: Stackpole International Powder Metal, ULC, Ancaster (CA)

(*) Notice: Subject to any disclaimer, the term of this patent is extended or adjusted under 35 U.S.C. 154(b) by 635 days.

(21) Appl. No.: 14/413,876

(22) PCT Filed: Jul. 8, 2013

(86) PCT No.: PCT/IB2013/001476
§ 371 (c)(1),
(2) Date: Jan. 9, 2015

(87) PCT Pub. No.: WO2014/009788
PCT Pub. Date: Jan. 16, 2014

(65) Prior Publication Data
US 2015/0207154 A1 Jul. 23, 2015

Related U.S. Application Data

(60) Provisional application No. 61/669,537, filed on Jul. 9, 2012, provisional application No. 61/701,956, filed on Sep. 17, 2012.

(51) Int. Cl.
*H01M 2/38* (2006.01)
*H01M 2/40* (2006.01)
(Continued)

(52) U.S. Cl.
CPC ......... *H01M 8/0232* (2013.01); *B22F 1/0014* (2013.01); *B22F 1/0059* (2013.01);
(Continued)

(58) Field of Classification Search
CPC ............. H01M 4/82; H01M 8/00; H01M 8/10
See application file for complete search history.

(56) References Cited

U.S. PATENT DOCUMENTS

| 5,288,345 A | 2/1994 | Ohhashi et al. |
| 2006/0024516 A1 | 2/2006 | Yoon et al. |

(Continued)

FOREIGN PATENT DOCUMENTS

| CA | 1040984 A | 10/1978 |
| CN | 101834298 | 9/2010 |

(Continued)

OTHER PUBLICATIONS

Camra et al, "Role of Al segregation and high affinity to oxygen in formation of adhesive alumina layers on FeCr alloy support", Catalysis Today 105 (2005) pp. 629-633 (Year: 2005).*

(Continued)

*Primary Examiner* — Cynthia H Kelly
*Assistant Examiner* — Julian Anthony
(74) *Attorney, Agent, or Firm* — Pillsbury Winthrop Shaw Pittman, LLP

(57) ABSTRACT

An interconnector for a solid oxide fuel cell is manufactured by single-press compacting a powder blend to form a green interconnector with a desired shape of a final interconnector. The powder blend includes chromium and iron, and may include an organic lubricant. At least 50 wt % or more of an iron portion of the powder blend comprises iron particles smaller than 45 um. The green interconnector is then sintered and oxidized to form the final interconnector. The oxidation step occurs in a continuous flow furnace in which (Continued)

a controlled atmosphere (e.g., humidified air) is fed into the furnace in the travel direction of the interconnector. The final interconnector comprises at least 90 wt % chromium, at least 3 wt % iron, and less than 0.2 wt % nitrogen. An average density within a flow field of the final interconnector may be less than 6.75 g/cc.

23 Claims, 8 Drawing Sheets

(51) Int. Cl.
| | |
|---|---|
| H01M 8/24 | (2016.01) |
| H01M 8/04 | (2016.01) |
| H01M 8/0232 | (2016.01) |
| C23C 8/10 | (2006.01) |
| C23C 8/02 | (2006.01) |
| H01M 8/0245 | (2016.01) |
| C22C 1/04 | (2006.01) |
| B22F 1/00 | (2006.01) |
| B22F 3/12 | (2006.01) |
| B22F 3/24 | (2006.01) |
| C23C 8/24 | (2006.01) |
| H01M 8/0243 | (2016.01) |
| H01M 8/124 | (2016.01) |

(52) U.S. Cl.
CPC .......... *B22F 3/12* (2013.01); *B22F 3/24* (2013.01); *C22C 1/045* (2013.01); *C23C 8/02* (2013.01); *C23C 8/10* (2013.01); *C23C 8/24* (2013.01); *H01M 8/0243* (2013.01); *H01M 8/0245* (2013.01); *B22F 2003/242* (2013.01); *B22F 2998/10* (2013.01); *B22F 2999/00* (2013.01); *H01M 2008/1293* (2013.01); *Y02P 70/50* (2015.11)

(56) References Cited

U.S. PATENT DOCUMENTS

| | | | | |
|---|---|---|---|---|
| 2006/0257703 | A1* | 11/2006 | Qi | ............ H01M 8/0276 |
| | | | | 429/495 |
| 2009/0004545 | A1* | 1/2009 | Haltiner, Jr. | ........ H01M 8/0228 |
| | | | | 429/486 |
| 2010/0178587 | A1* | 7/2010 | Inoue | ............ H01M 4/8605 |
| | | | | 429/495 |
| 2010/0233576 | A1 | 9/2010 | Brandner et al. | |
| 2010/0322811 | A1 | 12/2010 | Hodjat et al. | |
| 2013/0130152 | A1* | 5/2013 | Couse | ............ H01M 8/0258 |
| | | | | 429/508 |

FOREIGN PATENT DOCUMENTS

| | | |
|---|---|---|
| DE | 196 43 157 | 1/1998 |
| JP | 4-329861 | 11/1992 |
| JP | 08-78026 A | 3/1996 |
| JP | 10-183315 | 7/1998 |
| JP | 2010-219045 | 9/2010 |
| JP | 2011 054575 | 3/2011 |
| JP | 2012-508320 | 4/2012 |
| WO | WO 2010/147640 A1 | 12/2010 |
| WO | WO 2012/035900 | 3/2012 |

OTHER PUBLICATIONS

Partial European Search Report dated Jun. 22, 2016 for Appln. No. 15197060.5.
European Search Report dated Nov. 25, 2016 for Appln. No. 15197060.5.
Chinese Office Action dated Dec. 1, 2016 for Appln. No. 201380043387.2.
Japanese Office Action dated Feb. 14, 2017 for Appln. No. 2015-521079.
Chinese Office Action dated Mar. 1, 2016 for Appln. No. 201380043387.2.
Michalik, M. et al., "Effect of water vapour on growth and adherence of chromia scales on pure chromium," Schriften des Forschungszentrums Jülich, Reihe Energietechnik / Energy Technology 67, (2007), <http://hdl.handle.net/2128/2628>.
International Preliminary Report on Patentability issued in International Patent Application No. PCT/IB2013/001476, dated Oct. 6, 2014.
International Search Report and Written Opinion of the International Searching Authority issued in International Patent Application No. PCT/IB2013/001476, dated Nov. 13, 2013.
Extended European Search Report dated May 24, 2016 for Appln. No. 13817229.1.
U V D Crone et al.; "Oxidation behavior of mechanically alloyed chromium based alloys", Fresenius J. Anal Chem., vol. 358, May 1997, pp. 230-232.

* cited by examiner

FIG. 8: Effect Of Oxidation Atmosphere On Nitrogen Content

FUEL CELL INTERCONNECTOR AND METHOD FOR MAKING A FUEL CELL INTERCONNECTOR

CROSS-REFERENCE TO RELATED APPLICATIONS

This is the U.S. National Stage of PCT/IB2013/001476, filed Jul. 8, 2013, which in turn claims priority to U.S. Provisional Application No. 61/701,956, titled "FUEL CELL INTERCONNECTOR AND METHOD FOR MAKING A FUEL CELL INTERCONNECTOR," filed Sep. 17, 2012, and U.S. Provisional Application No. 61/669,537, titled "FUEL CELL INTERCONNECTOR AND METHOD FOR MAKING A FUEL CELL INTERCONNECTOR," filed Jul. 9, 2012, the entire contents of all of which are hereby incorporated by reference herein in their entireties.

BACKGROUND OF THE INVENTION

1. Field of the Invention

The present invention relates generally to interconnectors for solid oxide fuel cells (SOFC), and methods of manufacturing SOFC interconnectors using pressed powder metallurgy. Additionally and/or alternatively, the present invention relates to the controlled oxidation of porous chromium alloys such as interconnectors for SOFCs.

2. Description of Related Art

SOFCs directly produce electricity by oxidizing a fuel. In a typical planar geometry SOFC, an electrolyte layer (solid oxide or ceramic) is sandwiched between two electrodes (a cathode layer and an anode layer). Fuel flows past the outside of the anode layer (the oxidizing side) to provide $H_2$ to the anode. Air flows past the outside of the cathode layer (the reducing side) to provide $O_2$ to the cathode layer. The $H_2$ and an $O^-$ from the $O_2$ react to produce $H_2O$, which is exhausted on the fuel side of the anode. The reaction causes electron flow from the anode to the cathode, which provides electricity.

Individual SOFCs are typically stacked so that their electrical output is combined in series. An interconnector (also known as an interconnector plate or separator plate) separates adjacent SOFCs. As a result, opposing sides of an interconnector are exposed to the fuel side/oxidizing side of one SOFC and the air side/reducing side of an adjacent SOFC. The interconnector is typically designed to be substantially impermeable to the gaseous phase air and fuel so as to minimize uncontrolled combustion and catastrophic failure of an SOFC stack. An elevated temperature oxidation process step is often used in the PM manufacturing process whereby growth of an oxide layer is encouraged on the walls of the internal porosity such that internal pore channels become blocked by the formed oxide films and hence the oxidation process provides a desirable reduction in permeability relative to the un-oxidized condition.

End-plates are disposed at the end of an SOFC stack, and function as one-sided interconnectors. For ease of reference, an end plate is defined herein to be an interconnector.

Typical operating temperatures of SOFCs are between 600° C. and 1000° C.

U.S. Pat. Nos. 7,390,456, 8,173,063 and 6,316,136 and U.S. Patent Application Publication No. 2011/0135531 describe various interconnectors and methods of manufacturing interconnectors.

Powder metallurgy (PM) manufacturing methods have been used to manufacture interconnectors due to PM's available net shape forming capability. However, the components produced can contain residual internal porosity which poses problems with associated manufacturing methods and with final component function.

SUMMARY OF EMBODIMENTS OF THE INVENTION

The presence of the chromium nitrides (CrN's) in an interconnector tends to be undesirable for two reasons. First, the formation of the nitrides may cause a dimensional change to interconnectors. Excessive nitride formation may lead to warping of the interconnectors beyond allowable product dimensional tolerances and hence can reduce manufacturing yield. Second, even though lower levels of nitride may not have a significant effect on manufactured dimensions, even lower levels of nitrides yet may be undesirable with respect to SOFC function. In normal SOFC operation, the interconnectors are exposed to elevated temperatures and air for extended periods of time. In such an environment, nitrides originally present within the interconnector material may grow and introduce dimensional changes to the interconnector in-situ during operation of the SOFC. Such dimensional changes may impair the contact uniformity within the SOFC stack and hence lead to accelerated degradation of electrical efficiency over time of operation of the SOFC.

One or more embodiments of the present invention provide an oxidation process for porous chromium components (e.g., PM components such as interconnectors) that reduces the formation of nitrides in the component.

One or more embodiments of the present invention provide a method of oxidizing a porous component comprising at least 20 weight % chromium. The method includes: oxidizing the component in a furnace so as to expose the component to an oxidation temperature range for a predetermined time period; and during said oxidizing, feeding a controlled atmosphere into the furnace. The controlled atmosphere comprises at least 30 volume % nitrogen, at least 10 volume % oxygen, and at least 10 volume % water vapor. The oxidizing increases a nitrogen content of the porous component by less than 0.1 weight %.

According to one or more of these embodiments, after said oxidizing, the component comprises less than 0.3, 0.2, 0.15, and/or 0.10 weight % nitrogen.

According to one or more of these embodiments, the controlled atmosphere comprises at least 50 volume % ambient air.

According to one or more of these embodiments, the controlled atmosphere comprises at least 20 volume % water vapor.

According to one or more of these embodiments, the controlled atmosphere comprises between 10 and 30 volume % water vapor.

According to one or more of these embodiments, the method also includes adding water vapor to ambient air to create the controlled atmosphere.

According to one or more of these embodiments, the oxidation temperature range is above 750° C. and the predetermined time period is at least 5 hours.

According to one or more of these embodiments, the method also includes feeding the component through the furnace in a travel direction during said oxidizing, wherein the controlled atmosphere is fed into the furnace in the travel direction.

According to one or more of these embodiments, the method also includes feeding the component through the furnace in a travel direction during said oxidizing, wherein the controlled atmosphere is fed into the furnace in an opposite direction as the travel direction.

According to various embodiments, the component and controlled atmosphere may be fed through the furnace in the oxidation step in concurrent or counter flow directions.

According to one or more of these embodiments, the component comprises an SOFC interconnector.

Conventional wisdom in the interconnector industry was that PM interconnector density should be maximized in order to obtain maximum air/fuel impermeability. Because coarser iron particles are more compressible, the industry has conventionally relied on such coarser iron particles in an effort to maximize interconnector density, and thereby maximize air/fuel impermeability. In contrast, the present inventors discovered that according to various embodiments of the invention, good impermeability could be achieved at lower densities through the use of finer iron particles. It is believed that the use of finer iron particles results in an interconnector microstructure that is more easily sealed through oxidation than the microstructure that results from a denser interconnector made from coarser iron particles. According to various embodiments, the ability to achieve good impermeability at lower interconnector densities using finer iron particle sizes enables less expensive manufacturing techniques (e.g., avoiding a more expensive double-press procedure, using reduced sintering temperatures and/or sintering times because smaller iron particle size enhances chromium-to-iron diffusion which more readily achieves in a target coefficient of thermal expansion (CTE)) and reduces material cost by using less chromium per interconnector. According to one or more embodiments, the reduced chromium content requirement is advantageous because chromium is expensive, and interconnectors comprise a major fraction of the SOFC hardware cost. Reducing the total mass of the interconnectors may provide a significant cost advantage.

One or more embodiments of the present invention provide a faster, less expensive method for manufacturing an SOFC interconnector with good impermeability and dimensional characteristics.

One or more embodiments of the present invention provide an SOFC interconnector that utilizes a reduced amount of chromium per interconnector, thereby reducing the interconnector's material cost.

One or more embodiments of the present invention provide a Powder Metal (PM) process that enables fabrication of SOFC interconnectors with a high chromium content (e.g., over 90%), precise dimensional tolerances, thermal expansion properties that match the thermal expansion properties of adjacent electrolytes, and/or good impermeability. This combination is not readily manufactured by other methods such as stamping or rolling. The PM process according to one or more embodiments may provide a very precise, cost effective fabrication of parts, to very precise dimensional tolerances.

One or more embodiments of the present invention provide a method of manufacturing an interconnector for a solid oxide fuel cell. The method includes single-press compacting a powder blend to form a green interconnector with a desired shape of a final interconnector. The powder blend includes chromium and iron. At least 50 wt % of an iron portion of the powder blend comprises iron particles smaller than 45 um. The method also includes sintering the single-pressed green interconnector to form a sintered interconnector. The sintered interconnector comprises at least 90 wt % chromium and at least 3 wt % iron.

According to one or more of these embodiments, at least 60, 70, 80, and/or 90 wt % of the iron portion of the powder blend comprises iron particles smaller than 60 um.

According to one or more of these embodiments, at least 60, 70, 80, and/or 90 wt % of the iron portion of the powder blend comprises iron particles smaller than 45 um.

According to one or more of these embodiments, at least 40, 50, 60, 70, 80, and/or 90 wt % of the iron portion of the powder blend comprises iron particles smaller than 30 um.

According to one or more of these embodiments, at least 30, 40, 50, 60, 70, 80, and/or 90 wt % of the iron portion of the powder blend comprises iron particles smaller than 20 um.

According to one or more of these embodiments, the sintered interconnector comprises between 94.5 and 95.5 wt % chromium and between 4.5 and 5.5 wt % iron.

According to one or more of these embodiments, the method also includes blending iron powder and an organic lubricant to form a master iron/lubricant blend. The lubricant comprises at least 5 wt % of the master iron/lubricant blend. The method also includes blending the master iron/lubricant blend with chromium powder to form the powder blend, and delubricating the green interconnector before said sintering.

According to one or more of these embodiments, the lubricant comprises at least 1, 5, 10, and/or 20 wt % of the master iron/lubricant blend.

According to one or more of these embodiments, the sintering occurs over a sintering cycle time at a sintering temperature range that does not exceed 1450° C., 1425° C., and/or 1400° C.

According to one or more of these embodiments, the sintering temperature range does not fall below 1150° C., and the sintering cycle time is less than 3, 2, and/or 1.5 hours.

According to one or more of these embodiments, the sintering results in at least 70% and/or 80% diffusion of the chromium into the iron.

According to one or more of these embodiments, the method also includes oxidizing the sintered interconnector to form a final interconnector, wherein the final interconnector is impermeable to air and SOFC fuel. According to one or more of these embodiments, the oxidizing comprises passing the sintered interconnector through a continuous flow furnace in an interconnector travel direction while feeding an oxygen containing gas into the furnace in the interconnector travel direction. According to one or more of these embodiments, the final interconnector comprises a flow field over which air or gas is designed to flow during use of the interconnector, the flow field is impermeable to SOFC fuel and air, and the final interconnector has an average density within the flow field of less than 6.8, 6.75, and/or 6.73 g/cc.

According to one or more of these embodiments, the green interconnector comprises a flow field over which air or gas is designed to flow during use of the interconnector, and the green interconnector has an average density within the flow field of less than 6.75, 6.73, and/or 6.70 g/cc.

One or more embodiments of the present invention provide an interconnector for a solid oxide fuel cell. The interconnector includes a sintered body comprising at least 90 wt % chromium and at least 3 wt % iron. The body defines a flow field over which air or gas is designed to flow during use of the interconnector. An average density within the flow field is less than 6.75 g/cc. The flow field is impermeable to SOFC fuel and air.

According to one or more of these embodiments, the interconnector is formed from a pressed powder blend in which at least 50 wt % of an iron portion of the powder blend comprised iron particles smaller than 45 um.

According to one or more of these embodiments, the interconnector is manufactured according to any one of the methods disclosed herein.

One or more embodiments of the present invention provide an interconnector for a solid oxide fuel cell. The interconnector includes a sintered body comprising at least 90 wt % chromium and at least 3 wt % iron. The interconnector is formed from a pressed powder blend in which at least 50 wt % of an iron portion of the powder blend comprised iron particles smaller than 45 um.

These and other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

BRIEF DESCRIPTION OF THE DRAWINGS

For a better understanding of embodiments of the present invention as well as other objects and further features thereof, reference is made to the following description which is to be used in conjunction with the accompanying drawings, where.

DETAILED DESCRIPTION OF EXEMPLARY EMBODIMENTS OF THE INVENTION

Figure 1:
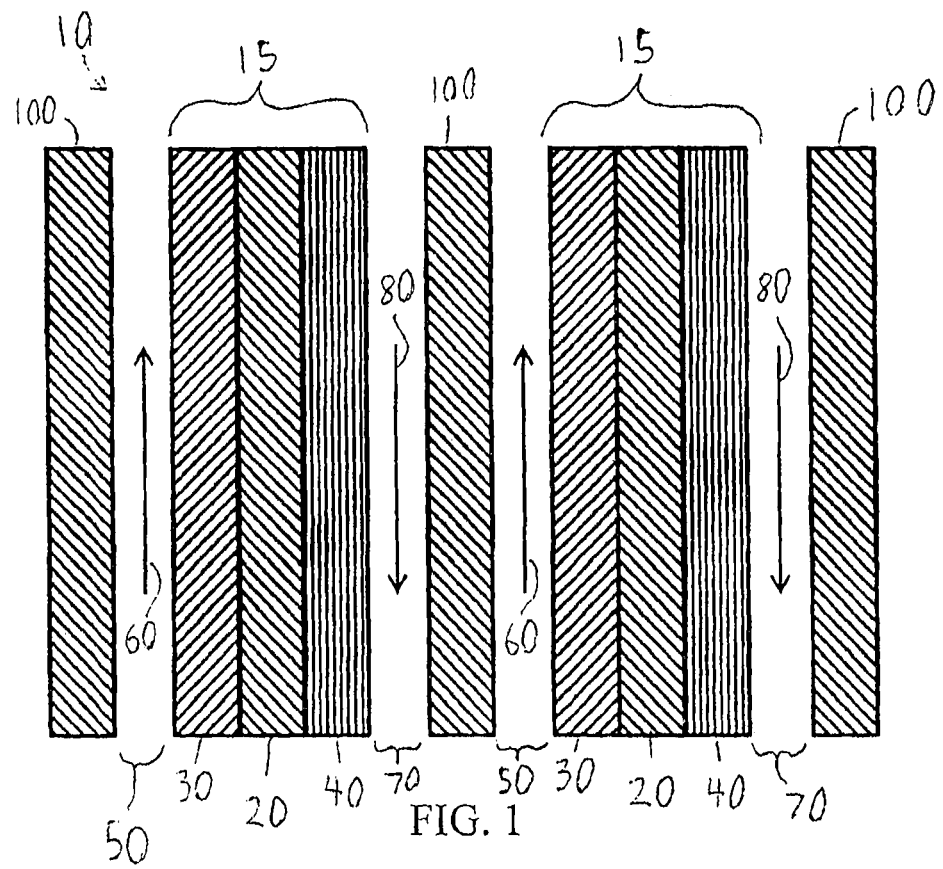
FIG. 1 is a diagrammatic cross-sectional view of an SOFC stack according to an embodiment of the invention.
Figure 2:
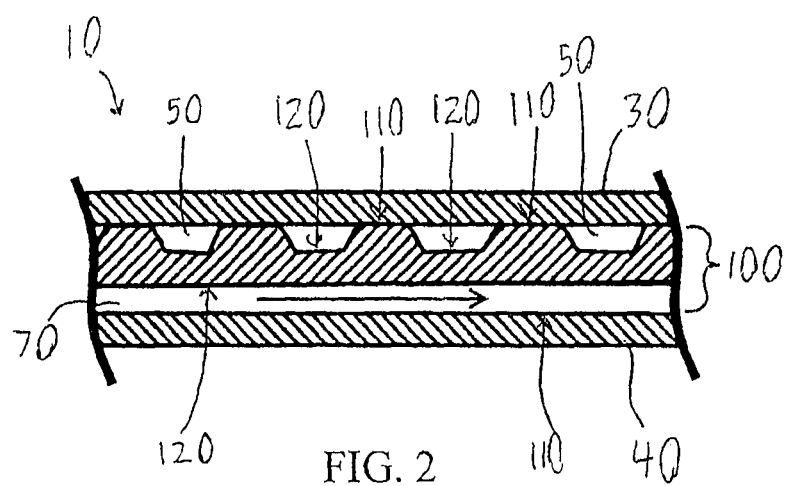
FIG. 2 is a partial cross-sectional view of the SOFC stack of FIG. 1.

FIGS. 1 and 2 illustrate an SOFC stack 10 according to an embodiment of the present invention. The SOFC stack 10 includes a plurality of SOFCs 15. Each SOFC 15 includes an electrolyte plate 20 sandwiched between two electrodes (an anode plate 30 and a cathode plate 40). A fuel side passage 50 (i.e., a series of channels) for the passage of fuel 60 is disposed adjacent each anode plate 30. An air side passage 70 (a series of channels) for the passage of air 80 is disposed adjacent each cathode plate 40. An interconnector 100 separates the fuel side passage(s) 50 for one SOFC 15 from the air side passage(s) 70 of an adjacent SOFC 15.

The interconnector 100 may have any shape and size suitable for use in an SOFC stack. In the embodiment illustrated in FIGS. 2 and 5, each side of the interconnector 100 includes a series of alternating ridges 110 and valleys 120. As shown in FIG. 2, the ridges 110 on opposite sides of the interconnector 100 abut the electrodes 30,40, respectively, of adjacent SOFCs 15 such that the spaces formed between the ridges 110, valleys 120, and respective electrodes 30,40 create the fuel and air side passages 50, 70, respectively.

Figure 5:
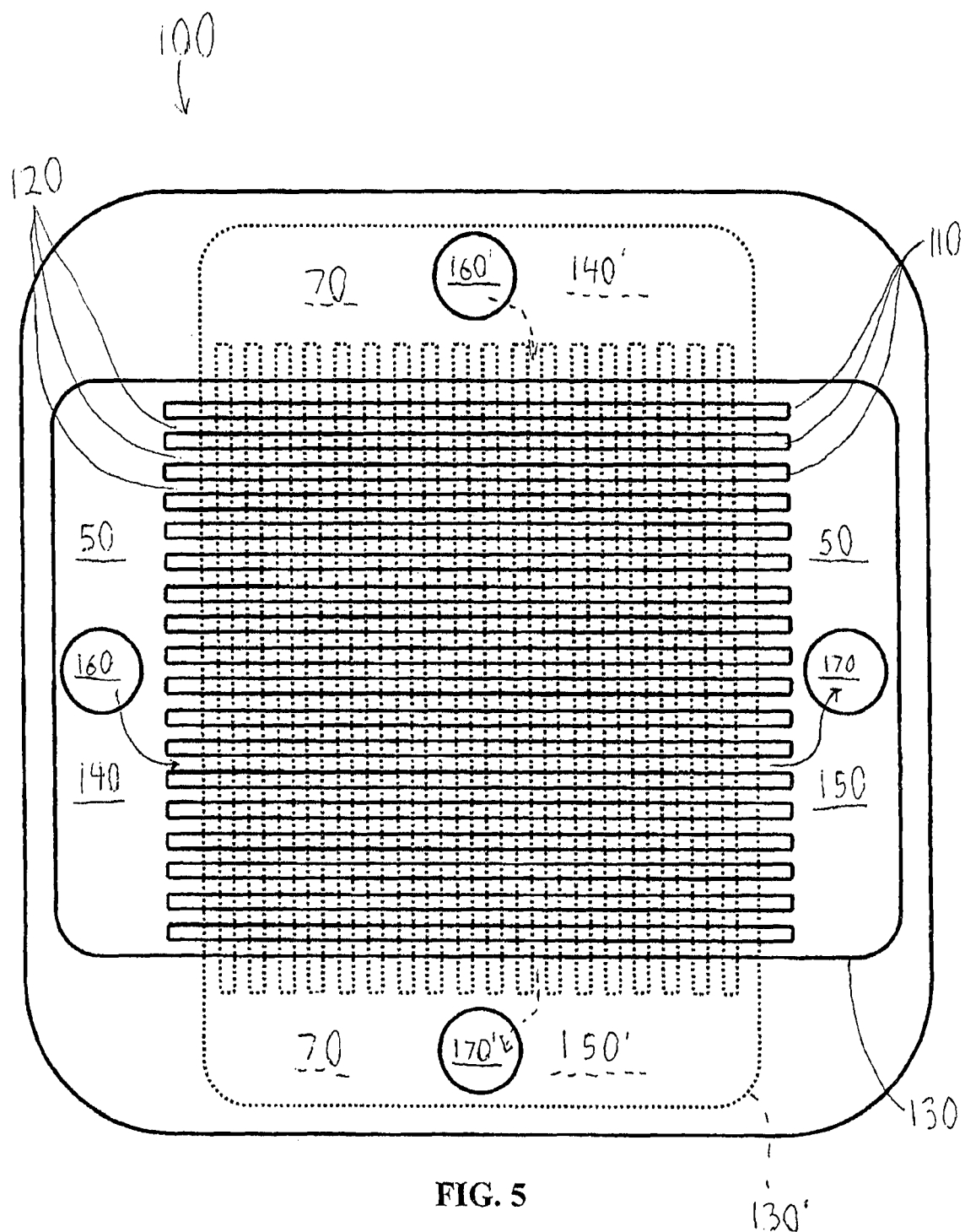
FIG. 5 is a plan view of the interconnector of the SOFC stack of FIG. 1.

FIG. 5 is a plan view of the fuel side of the interconnector 100. The fuel side passage 50 is defined by a depression 130 in the interconnector 100. The depression 130 defines the valleys 120, and the ridges 110 rise up from the depression 130. Fuel supply and exhaust plenum regions 140, 150 are defined on upstream and downstream sides of the ridges 110/valleys 120, respectively. A fuel supply hole 160 leads into the fuel supply plenum 140. A fuel exhaust opening 170 leads from the exhaust plenum region 150. Fuel 60 flows into the fuel side passage 50 and supply plenum 140 from the supply opening 160, through the valleys 120 into the exhaust plenum 150 (along with produced water), and out of the exhaust opening 170.

Corresponding air side depression 130', valleys 120, ridges 110, and air supply and exhaust plenums 140', 150' and holes 160', 170' are disposed on the opposite side of the interconnector 100 and are shown in phantom dotted lines in FIG. 5.

The interconnector 100 includes a flow field that encompasses the regions of the interconnector 100 over which fuel or air are designed to flow. In the interconnector 100 illustrated in FIG. 5, the flow field of the interconnector 100 is bounded by the perimeter of the depressions 130, 130', and is generally + shaped. The perimeter of the interconnector 100 outside of the depressions 130, 130' are not part of the flow field. In embodiments where the air/fuel passages 50, 70 extend beyond the edges of the interconnector (i.e., to the top, bottom, left, and/or right of the interconnector as viewed in FIG. 5), the flow field of the interconnector extends to that edge. As explained in greater detail below, it is typically important that the flow field portion of the interconnector 100 be impermeable to fuel 60 and air 80.

Figure 3:
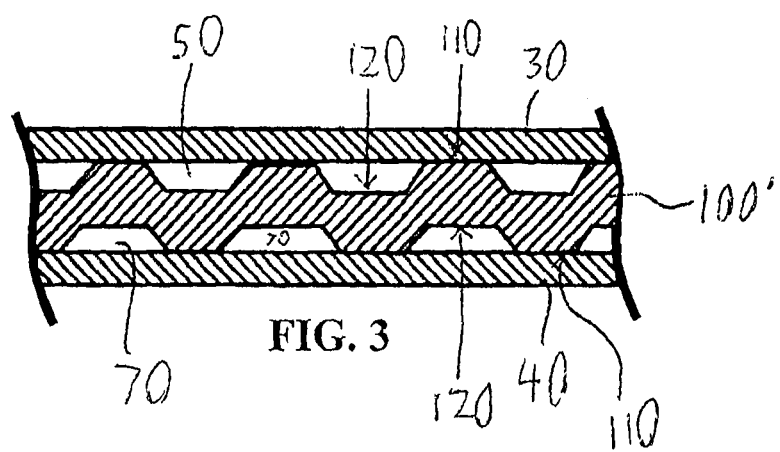
FIG. 3 is a partial cross-sectional view of an interconnector of the SOFC stack of FIG. 1.

In the embodiment illustrated in FIGS. 2 and 5, the ridges 110 and valleys 120 on one side of the interconnector 100 extend perpendicularly relative to the ridges 110 and valleys 120 on the other side of the interconnector 100. As a result, as illustrated in FIG. 2, the fuel side passages 50 extend into the sheet and the air side passages 70 extend left to right. Consequently, the SOFC stack 10 is designed so that the fuel 60 flows in one direction, while the air 80 flows in a perpendicular direction. However, according to alternative embodiments, the fuel and air side passages 50,70 may be parallel (e.g., as shown in the alternative interconnector 100' illustrated in FIG. 3) or run in any other suitable direction relative to each other without deviating from the scope of the present invention.

Figure 4:
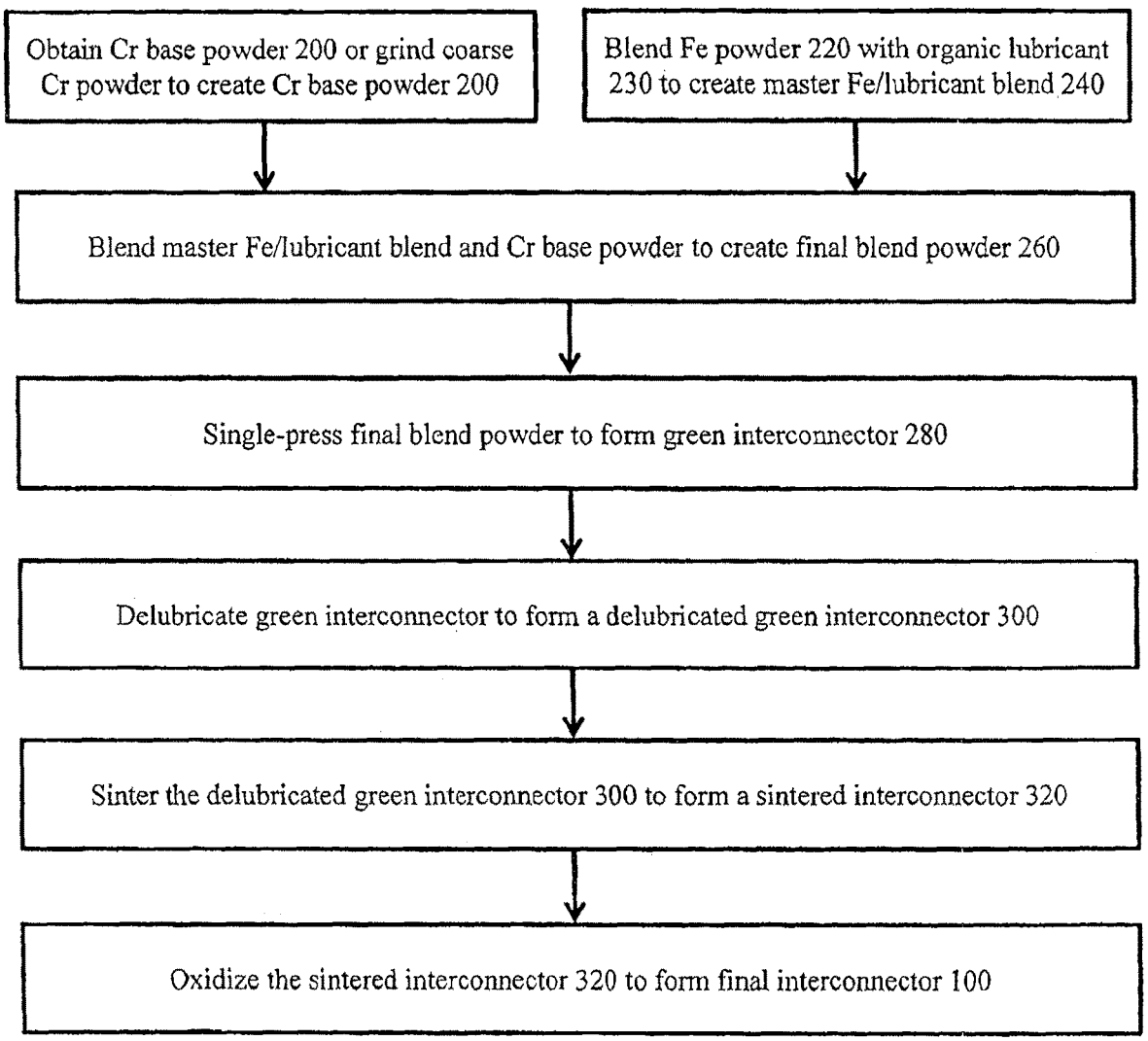
FIG. 4 is a flowchart illustrating the manufacture of the interconnector of FIG. 3 according to various embodiments of the invention.

Hereinafter, methods of making the interconnector 100 according to various embodiments are described with reference to FIG. 4.

Chromium (Cr) base powder 200 is produced from coarse chromium feedstock of about 20 mm to 6 mm× down by grinding with hammer mills, pin mills, and/or other suitable grinding machinery and then classified. The coarse chromium feedstock according to various embodiments comprises at least 90%, 95%, 97%, 98%, 99%, and/or 99.3% chromium (e.g., aluminothermic chromium, chromium powder produced using another suitable method).

Unless otherwise stated, all percentages disclosed herein are weight percentages. Unless otherwise stated particle sizes refer to screen classification using square openings. For example, particles smaller than 45 um mean particles that fall through a 45 um×45 um square opening. In contrast any dXX values (e.g., D50) refer to the XX % distribution particle by number of particles (not by weight). Thus, a powder with a D50 of 100 um means that 50% of the particles (by number of particles, not mass) are larger than 100 um and 50% are smaller.

According to various embodiments, the chromium powder is classified to under 160 um (i.e., substantially all particles fall through a 160 um×160 um opening) via a suitable screen, with a D50 of somewhere between 80-150 um and/or between 110-150 um, and a maximum of 5%, 10%, 20%, and/or 30% chromium particles smaller than 45 um to create the chromium base powder 200. According to various embodiments, the chromium base powder 200 comprises no more than 5% chromium particles larger than 200 um, no more than 10% chromium particles larger than 160 um, as much as 100% chromium particles larger than 63 um, and no more than 1% chromium particles smaller than 45 um. According to various other embodiments, the chromium base powder 200 comprises no more than 1% chromium particles larger than 160 um, at least 75% chromium particles larger than 63 um, and no more than 15% chromium particles smaller than 45 um. According various embodiments, the chromium base powder 200 comprises no more than 0.1% chromium particles larger than 200 um, no more than 2% chromium particles larger than 160 um, 80-100% and/or 84-96% chromium particles larger than 63 um, and no more than 5% chromium particles smaller than 45 um.

Iron (Fe) powder 220 is blended with a lubricant (e.g., an organic lubricant, an organo-metallic lubricant, or any other type of suitable lubricant that can be used in pressed PM) 230 to create a master iron/lubricant blend 240. According to various embodiments, the iron powder 220 comprises at least 95%, 97%, 98%, 99%, 99.5%, and/or 99.9% pure iron. According to various embodiments, the Iron powder 220 comprises at least 30%, 40%, 50%, 60%, 70%, 80%, 90%, 95%, 97%, 98%, 99%, 99.5%, 99.6%, 99.7%, 99.8%, and/or 99.9% iron particles smaller than 75, 70, 60, 50, 45, 40, 35, 30, 25, 20, 15, and/or 10 um. According to various embodiments, the iron powder 220 may comprise any combination of these percentages and size limitations (e.g., anywhere from 30% being smaller than 75 um to 99.9% being smaller than 10 um).

The iron powder 220 may be heterogeneous such that, for example, at least 90% of iron particles are smaller than 50 um and at least 50% are smaller than 20 um. Again, any combination of sets of the above-listed percentages and size limits may be used. A combination of coarser and finer iron particles may be used to provide the better flow and compression characteristics of larger iron particles, while still providing the improved impermeability characteristics of smaller iron particles.

According to one or more embodiments, the iron powder 220 comprises a high purity, fine iron powder such as a powder having a typical screen analysis of d10 5 um, d50 15 microns, and d90 30 microns and a chemical analysis (wt %) of 98+% iron, 0.150% carbon, 0.800% oxygen, 0.015% sulphur, and 0.010% phosphorus, or a powder having a typical chemical analysis of 99.7% iron, 99.5% iron-met, 0.09% O-tot, 0.003% C, 0.009% S, 0.005% P, 0.002% Si, 0.09% Mn and a typical sieve analysis of 0.0% over 150 microns, 0.3% between 75-150 microns, 1% 63-75 microns, 12% 45-63 microns, and 87% under 45 microns, or a mixture of such powders (e.g., 75/25, 50/50, 25/75).

According to various embodiments, the master iron/lubricant blend 240 has an organic lubricant 230 weight percentage of between 1 and 30%, between 5 and 25%, between 10 and 20%, and/or between 12.5 and 17.5%. Embodiments using iron powders 220 with smaller particles sizes may be first separately combined with larger amounts of lubricant than in embodiments in with coarser iron powders because ease of flow tends to be inversely proportional to particle size. However, according to various embodiments, lubricant 230 is omitted altogether. For example, one or more embodiments using coarser iron powder may not use any lubricant 230.

The chromium base powder 200 and master iron/lubricant blend 240 are then blended to create a final blend powder 260. According to various embodiments, the final blend powder 260 comprises at least 90, 91, 92, 93, 94, and/or 95% base chromium powder. The balance of the final blend powder 260 preferably comprises the master iron/lubricant blend 240. According to various embodiments, the final blend powder 260 comprises at least 0.4% organic lubricant 230. According to various embodiments, the final blend powder 260 comprises between 1 and 9% iron. According to one or more embodiments, the final blend powder 260 comprises about 94-96% chromium, at least 4% and/or 5% iron, and at least 0.10%, 0.2%, 0.3%, and/or 0.4% lubricant 230. According to one or more embodiments, the final blend powder 260 comprises 0.65% organic lubricant.

According to various embodiments, the chromium base powder 200 and master iron/lubricant blend 240 are blended at about room temperature (e.g., between 15° C. and 27° C. and/or about 21° C.) to form the final blend powder 260. According to one embodiment, a double cone blender and 40 minute blending cycle is used.

According to other embodiments, the chromium base powder 200 and master iron/lubricant blend 240 are blended at temperatures above room temperature (e.g., above 27, 40, 50, 70, and/or 100, and below 140° C., 130° C., 120° C., and/or 110° C.) to form the final blend powder 260. According to one embodiment, a jacketed DC blender and a 2 hour cycle (including heating time and blending time) is used. According to one or more embodiments, blending at elevated temperatures proves good flow characteristics. According to various embodiments, the blending temperature is kept below a inciting temperature of the lubricant 230.

A die-cavity having the desired cavity shape of the final interconnector 100 is then appropriately filled with the final blend powder 260. After the die-cavity is filled with the final blend powder 260, the final blend powder 260 is single-stage compacted/pressed in a closed die to form a green interconnector 280. According to various embodiments, the green interconnector 280 has essentially the final shape and size of the final interconnector 100 (except for minor size and shape changes that result from post-pressing elastic rebound, sintering, further heat treatments, and/or oxidation). According to various embodiments, the single stage compaction creates the ridges 110, valleys 120, depressions 130, 130', plenums 140, 140', 150, 150', and holes 160, 160', 170, 170'. According to various embodiments, the compaction is carried out at 40-100 Tsi and/or 60-75 Tsi using a press (e.g., a hydraulic press, a hybrid press, or any other suitable press).

According to various embodiments, the compaction/pressing is carried out via a single pressing procedure, as opposed to a conventional two-stage pressing procedure (e.g., the two-stage pressing procedure disclosed in U.S. Pat. No. 8,173,063).

According to various embodiments, the green interconnector 280 has a green strength of at least 400, 500, 600, and/or 700 psi. According to various embodiments, the green interconnector 280 has an average green density within the flow field of at least 6.50, 6.55, 6.60, 6.63, 6.65, and/or 6.67 g/cc and/or less than 6.80, 6.78, 6.75, 6.72, 6.70, 6.68, 6.66, and/or 6.65. According to one or more embodiments, the green density is about 6.65 g/cc on average in the flow field.

According to one or more embodiments, if lubricant 230 was used, the green interconnector 280 is delubricated in air at between 300° C. and 500° C. (e.g., about 400° C.) for 1 to 3 hours to substantially remove the lubricant 230 and form a delubricated green interconnector 300. However, depending on the lubricant 230 properties and content and the size and dimensions of the green interconnector 280, alternative temperatures and/or delubricating times may be used.

The delubricated green interconnector 300 (or green interconnector 280 if lubricant was not used) is then sintered to form a sintered interconnector 320. According to various embodiments, the delubricated green interconnector 300 is sintered in a furnace maintained within a sintering temperature range (e.g., at temperatures that are at least 1150° C. and/or 1250° C. and are less than 1450° C., 1425° C., and/or 1400° C.) over a sintering cycle time that is between 30 minutes and 3 hours, 45 minutes and 2 hours, and/or 1 and 1½ hours to metallurgically bond the chromium and iron particles together and diffuse the chromium into the iron. According to various embodiments, the sintering cycle time is less than 3, 2, and/or 1.5 hours at the sintering temperature range. According to various embodiments, the sintering environment comprises at least 80%, at least 90%, and/or up to 100% $H_2$. According to one or more embodiments, the delubricated green interconnector is sintered for a cycle time of 70 minutes in a furnace with a sintering temperature that ranges from 1150° C. to 1380° C. over the course of the 70 minute cycle in a sintering environment that comprises about 95% $H_2$ and about 5% Ar. According to one or more embodiments, sintering is carried out in a pusher furnace with two sealed exit doors and at least 5 zones of thermal control.

For a given chemistry interconnector (e.g., 95% chromium/5% iron), coarser iron particles result in fewer chromium/iron contact points through which diffusion can occur. Coarser iron particles also result in longer pathways into the center of each iron particle. The fewer contact points and longer pathways typically require high sintering temperatures (e.g., over 1450° C.) and/or longer sintering times to achieve the desired diffusion levels and associated target coefficient of thermal expansion (CTE) levels. Higher sinter temperatures and longer processing times tend to result in higher manufacturing costs. In contrast, the use of smaller iron particle sizes according to various embodiments facilitates lower sintering temperatures and sintering times while still achieving desired diffusion/CTE levels.

According to various embodiments, the atmosphere flow in the sintering furnace reduces the surface iron and chromium oxides, which are barriers to diffusion, allowing particle bonding and diffusion to proceed.

According to various embodiments, a thermal profile of the sintering step results in a level of chromium into iron diffusion of at least 60%, 70%, 75%, 78%, and/or 80% throughout the sintered interconnector 320. According to various embodiments, the sintering results in 80-85% diffusion of the chromium into the iron.

According to various embodiments, the sintered interconnector 320 has an average density in the flow field of at least 6.50, 6.55, 6.60, 6.63, 6.65, 6.67, 6.68, 6.69, and/or 6.70 g/cc, and/or less than 6.8, 6.78, 6.75, 6.73, 6.70, and/or 6.68 g/cc. According to one or more embodiments, the sintered density is about 6.65 g/cc on average in the flow field. According to various embodiments, some densification is achieved through sintering (e.g., a 0.5-2% density increase from the green interconnector density).

According to various embodiments, the sintering process results in a sintered interconnector 320 with a nitrogen content of less than 0.10%, 0.09%, 0.08%, 0.07%, and/or 0.065%. According to various embodiments, the low nitrogen content may prevent or limit distortion of the final interconnector 100. According to various embodiments, nitrogen content of the interconnector is reduced by reducing the nitrogen content of the atmosphere to which the interconnector is exposed (e.g., before, during, or after sintering).

Because SOFCs experience a wide temperature range during use (e.g., from startup, through operation, and then through shutdown), it is typically preferable for the final interconnector 100 to have a coefficient of thermal expansion (CTE) that is about equal to the CTE of the electrolyte plate 20 so that they synchronously expand and contract during startup, operation, and shutdown of the SOFC stack 10. According to various embodiments, the combination of chromium/iron ratio and sintering protocol (which controls the resulting degree of chromium-into-iron diffusion) impact the resulting CTE of the final interconnector 100. Consequently, the chromium/iron ratio and sintering protocol may be tailored to match the CTE of the final interconnector 100 with the CTE of electrolytes commonly used in SOFCs. According to one or more embodiments, an interconnector 100 with a 95% chromium/5% iron content and over 80% diffusion has a CTE that is well suited to one or more commonly used types of electrolyte plates 20.

Figure 7:
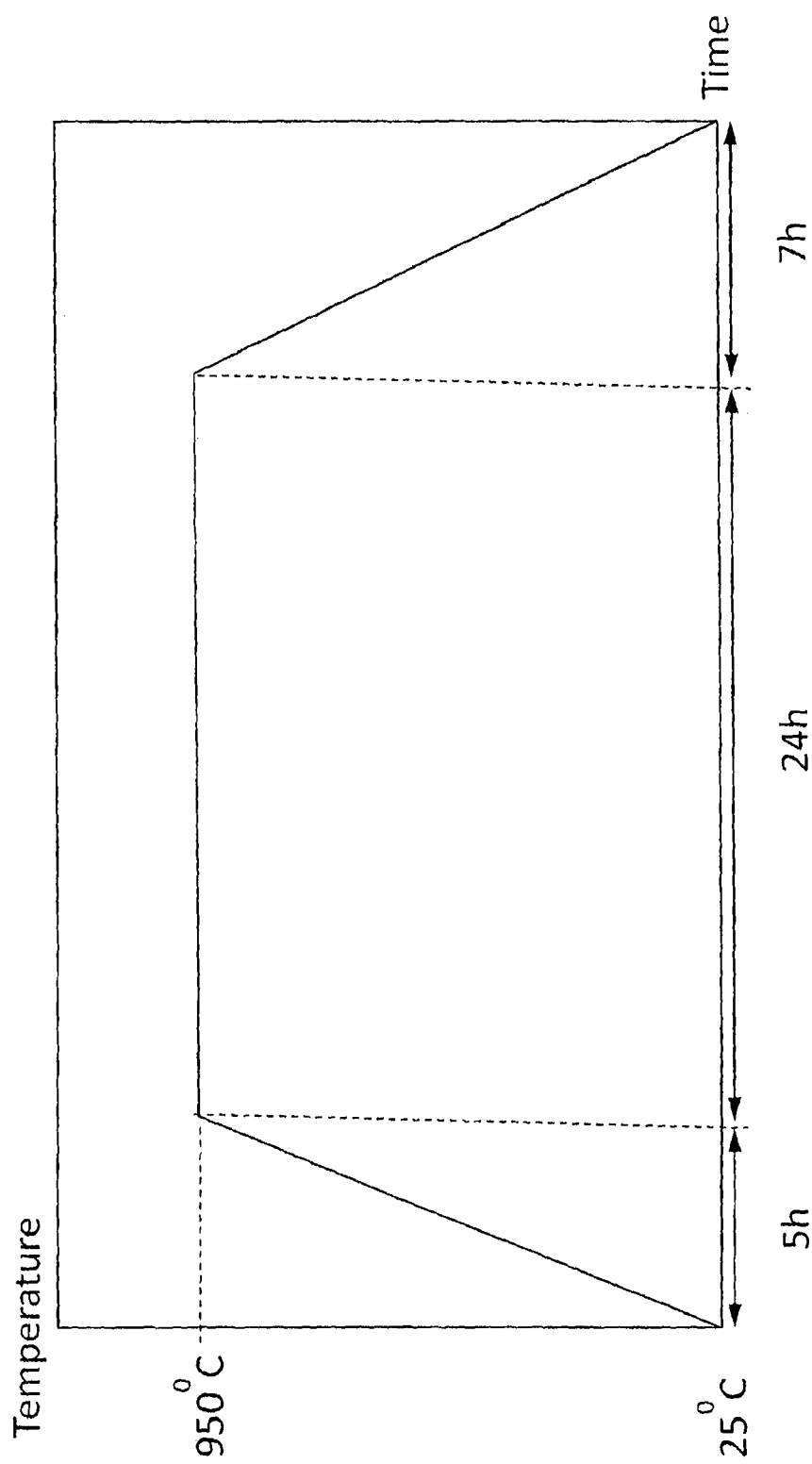
FIG. 7 shows temperatures, times and atmospheres used in the oxidation process according to an embodiment of the present invention.

According to various embodiments, the sintered interconnector 320 is thermally stabilized and sealed by oxidation at oxidation temperatures of between 500° C. and 1100° C. (e.g., at least 500° C., 600° C., 700° C., 800° C., and/or 900° C., and/or between 900° C. and 1000° C., and/or less than 1200° C., 1100° C. and/or 1000° C.) for at least 5, 10, 15, and/or 20 hours and less than 40, 35, 30, and/or 25 hours. According to one or more embodiments, oxidation begins to take place at a reasonably fast rate at temperatures of 500° C. and above. According to one or more embodiments, oxidation is carried out by keeping the sintered interconnector 320 in a 950° C. oxidation environment for 20-24 hours. FIG. 7 illustrates an oxidation process according to one or more embodiments, in which the furnace atmosphere to which the interconnectors are exposed ramps from ambient temperature (e.g., 25° C.) to 950° C. over 5 hours. The environment is maintained at about 950° C. for 24 hours. The environment is then ramped back down to ambient temperature over about 7 hours.

Figure 9:
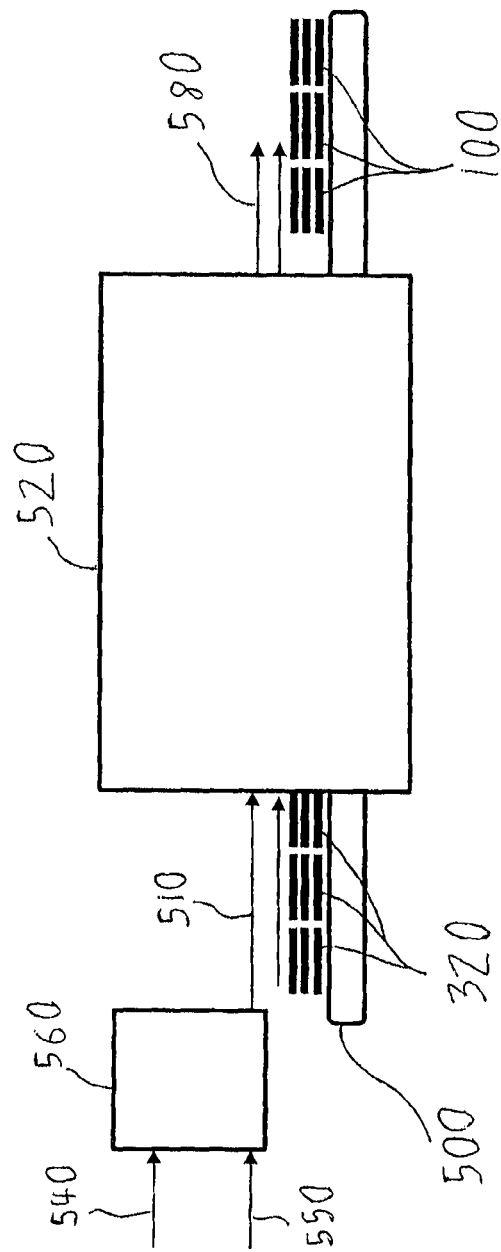
FIG. 9 is a diagram showing the oxidation of interconnectors in an oxidation furnace according to one or more embodiments of the present invention.

As shown in FIG. 9, according to various embodiments, sintered interconnectors 320 are oxidized in a continuous process in which the sintered interconnectors 320 are stacked on a furnace mesh belt 500 on ceramic setters that may help to maintain flatness of the resulting final interconnectors 100. A controlled atmosphere 510 (described in greater detail below) is fed into the oxidizing furnace 520 in the direction that the mesh belt 500 and sintered interconnectors 320 flow to provide the reaction gas (oxygen) to the environment around the interconnectors 320 within the furnace 520. According to various embodiments, such concurrent flow direction may help facilitate oxidation as the interconnectors 320 heat up (e.g., between 500° C. and 700° C.) and before nitridation might otherwise take over at higher temperatures (e.g., at or above 700° C.). Such concurrent flow may additionally or alternatively improve the oxidation cycle by moderating the temperatures to which the interconnectors are exposed (e.g., perhaps by causing the temperatures experienced by the interconnectors in the beginning of the oxidation cycle to ramp up more slowly and/or uniformly). According to alternative embodiments, the interconnectors 320 may be oxidized in a batch furnace instead of a continuous flow furnace. The controlled atmosphere 510 may be fed through the batch furnace over the course of the oxidation batch process to maintain an available supply of oxygen for the oxidation process.

According to various alternative embodiments, the controlled atmosphere 510 may be provided to the furnace 520 in a counter flow direction, rather than a concurrent flow direction. In various counter flow embodiments, the controlled atmosphere enters the furnace 520 at or around the portion of the furnace 520 where the oxidized interconnectors 100 exit, and exhausts out of the furnace 520 at or around the portion of the furnace where the sintered interconnectors 320 enter the furnace 520). This alternative counter flow process is similar to the process shown in FIG. 9, but with arrows 510 and 580 shown in flipped directions and positions, and the humidifier 560 being repositioned accordingly.

According to various embodiments, the controlled atmosphere 510 is fed into the furnace 520 continuously throughout the entire oxidation cycle starting as soon as the interconnectors 320 are initially fed into the furnace 520. According to alternative embodiments, the controlled atmosphere 510 is only fed into the furnace 520 while the interconnectors 320 are exposed to an oxidizing temperature environment (e.g., when the interconnectors are exposed to an environment with a temperature that is above 300° C., 400° C., and/or 500° C.).

Figure 6:
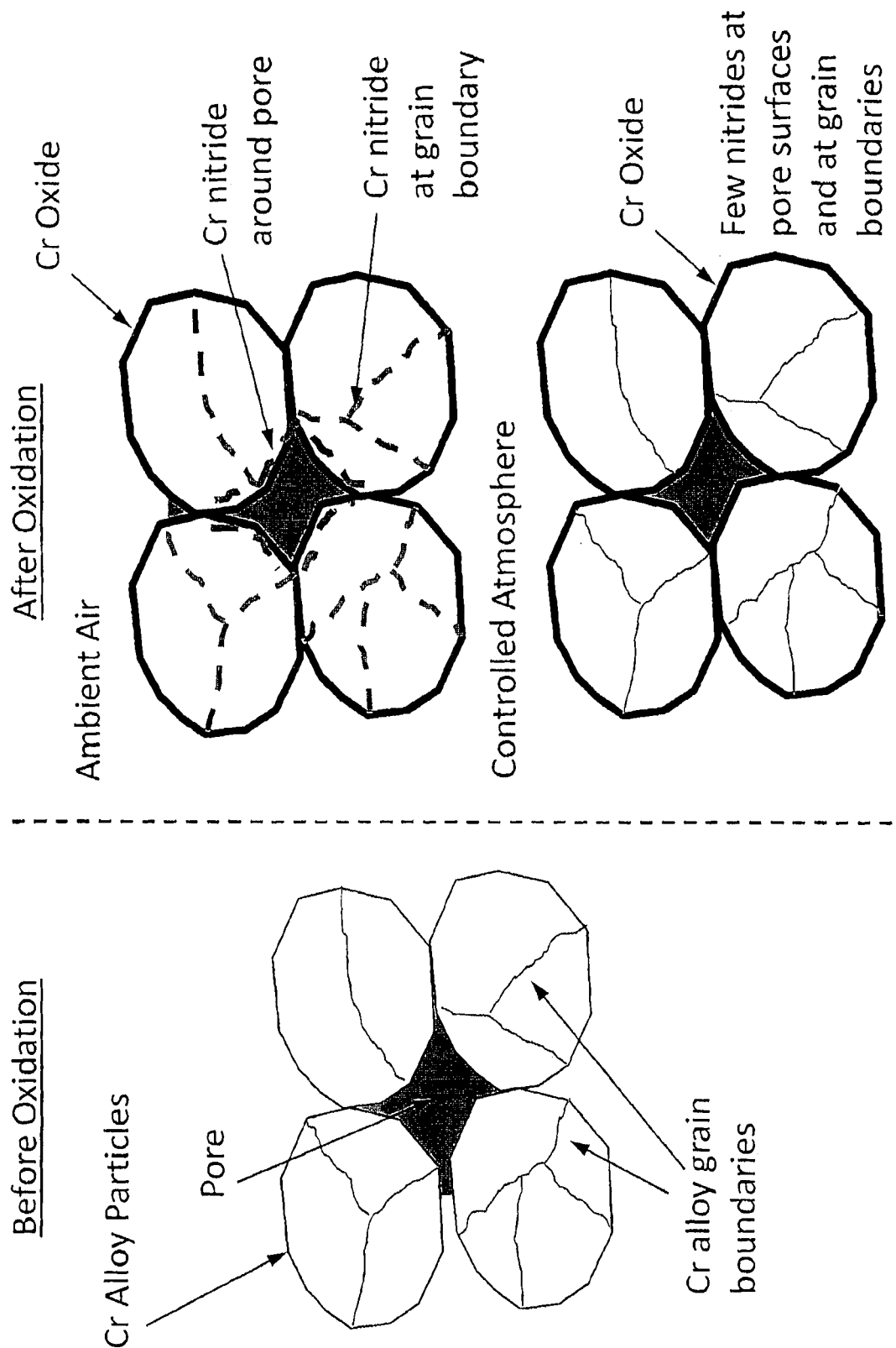
FIG. 6 illustrates the nature of formation of chromium nitrides in a porous chromium alloy.

As shown in FIG. 6, when oxidizing sintered interconnectors 320 in ambient air (e.g., air with about 1-4% water vapor content) it has been observed that nitrides of chromium can form within the internal microstructure. After oxidation of a porous Cr alloy interconnector in ambient air the microstructure tends to show areas of enrichment of nitrogen in the areas surrounding the pores and also within the inner material grain boundaries as shown in FIG. 6 after exposure to the oxidation process in ambient air.

Figure 8:
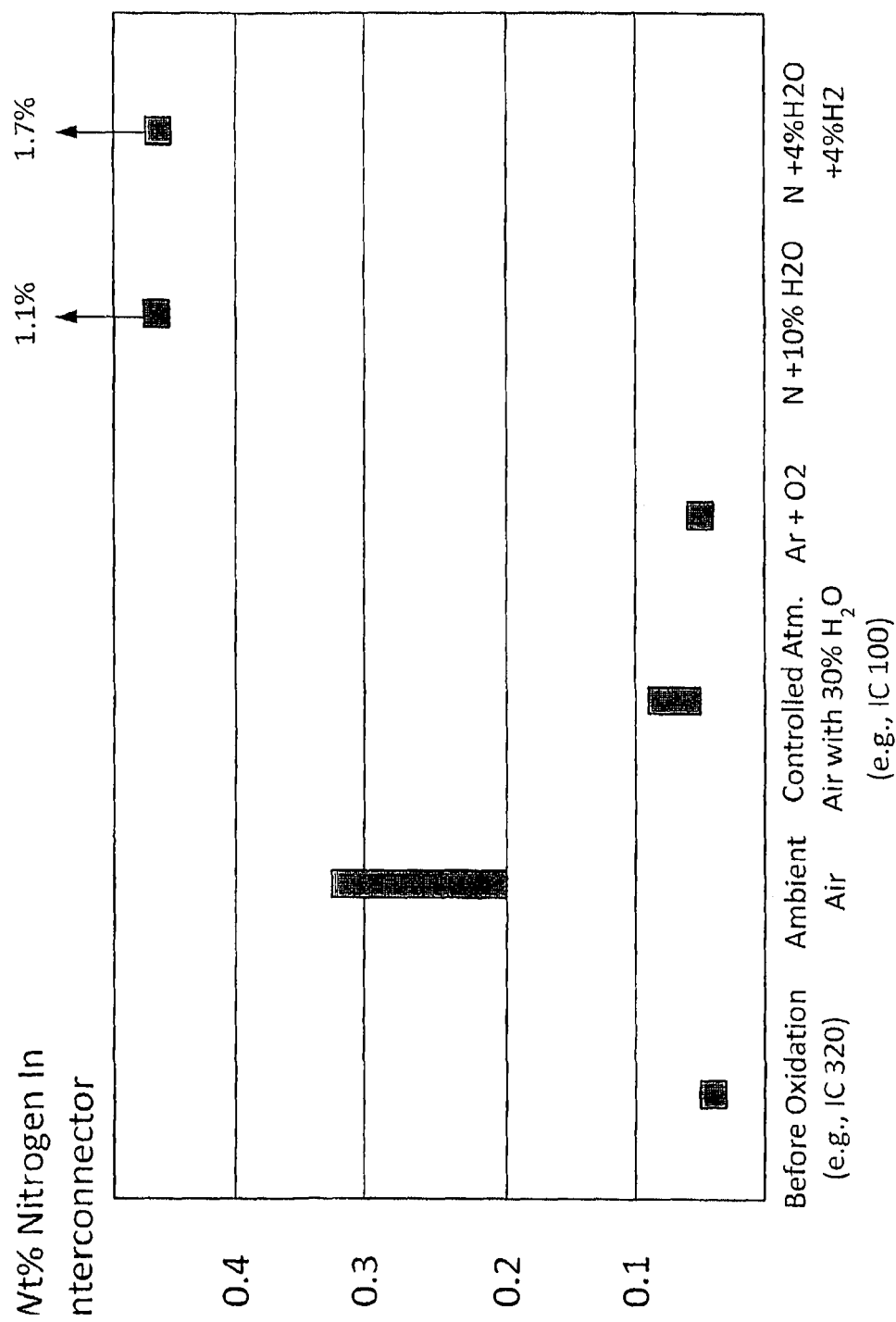
FIG. 8 shows the effect of oxidation atmosphere on final nitrogen content according to an embodiment of the present invention.

The formation of nitrides is a result of the combination at elevated temperature of the Cr base metal and nitrogen contained in the ambient air. According to various embodiments, the amount of such nitrides in the interconnector is preferably reduced. Thus, one or more embodiments of the present invention provide an oxidation process for porous chromium components (e.g., PM components such as interconnectors) that reduces and/or minimizes the formation of nitrides in the component. Reducing the extent of nitride formation in the interconnector may increase the overall interconnector yield during manufacturing (e.g., because more of the interconnectors 100 are within dimensional tolerances) and may result in interconnectors with improved life-long dimensional accuracies during use in an SOFC stack. Methods of reducing nitrogen absorption have been suggested in the literature for fully dense Cr materials, for example Michalik used a mixture of (1) nitrogen with 4% $H_2O$, and 4% $H_2$, or (2) nitrogen with 10% $H_2O$ to suppress nitride formation. However, as shown in FIG. 8, those methods were found to be ineffective when applied to porous Cr alloys (e.g., PM interconnectors) where nitrogen content after oxidation actually increased to in excess of 1 wt %. See Michalik 2007 Effect of water vapour on growth and adherence of chromia scales, Julich Research Thesis.

As shown in FIG. 8, according to one or more embodiments, oxidation in a nitrogen-free Argon/Oxygen mixture may maintain nitrogen content to the pre-oxidized level of around 0.05%. Accordingly, various embodiments of the present invention utilize a substantially nitrogen-free Ar/O atmosphere during the oxidation process. However, according to various embodiments, the use of an Ar/O atmosphere is not practical due to high cost of process atmosphere or the need to use complex and costly manufacturing equipment with atmosphere recycling capability.

According to one or more alternative embodiments, the interconnectors 320 are oxidized in a controlled atmosphere 510 comprising ambient air 540 and an elevated level of water-vapor 550. According to various embodiments, as shown in FIG. 9, the controlled atmosphere 510 is created by humidifying ambient air 540 in a humidifier 560 to create the controlled atmosphere 510. According to various embodiments, the water vapor content of the controlled atmosphere 510 that is pumped into the furnace 520 during the oxidation step comprises ambient air 540 with a water vapor content (by volume) of at least 5%, 10%, 15%, 20%, and/or 25%, less than 50%, 40%, and/or 35%, and or between 10% and 40%, between 10% and 30%, and/or between 15% and 25%. According to one or more embodiments the water vapor content in the controlled atmosphere is 20%. According to one or more of these embodiments, this controlled atmosphere 510 has been found to provide an effective means of controlling/limiting the final nitrogen content in the oxidized Cr alloy. According to various embodiments, the ambient air 540 to which the water vapor 550 is added already includes (by volume %):

60-95%, 70-90%, 70-85%, 75-85%, and/or about 78% nitrogen (N);

5-35%, 10-30%, 15-25%, and/or about 21% oxygen ($O_2$); and 0-4% water vapor ($H_2O$).

The amount of water vapor 550 to be added to the ambient air 540 will depend on the starting humidity of the ambient air 540. According to various embodiments, less water vapor 550 is added to more humid air 540 to create the controlled atmosphere.

According to various embodiments the controlled atmosphere 510 comprises:

30-95%, 40-90%, 45-80%, 45-70%, 50-60%, and/or about 55% nitrogen (N);

5-40%, 5-35%, 10-30%, 10-25%, 10-20% and/or about 15% oxygen ($O_2$); and 5-50%, 10-40%, 10-35%, 20-35%, and/or about 30% water vapor ($H_2O$).

Unless otherwise specifically stated, all atmospheric percentages are volume percentages based on the atmosphere being at standard ambient temperature and pressure (SATP)

(i.e., 25° C. and 101.3 kPa). All atmospheric percentages may alternatively be considered to be molar percentages at SATP. Thus, according to various embodiments, the controlled atmosphere comprises 5-50%, 10-40%, 10-35%, 20-35%, and/or about 30% water vapor ($H_2O$) by volume and/or by molar concentration. According to various embodiments, the controlled atmosphere 510 being injected into the furnace 520 is actually injected at approximately SATP, such that the volume percentages may be measured as they are injected into the furnace 520. According to alternative embodiments, the controlled atmosphere 510 may be injected into the furnace 520 at other temperatures or pressures (though the atmospheric percentages are still measured at SATP).

The water vapor content of the controlled atmosphere 510 may alternatively be measured in terms of dew point. According to various embodiments, the dew point of the controlled atmosphere 510 (at standard ambient pressure of 101.3 kPa) is at least 40° C., 45° C., 50° C., and/or 55° C., and/or between 40° C. and 100° C., between 45° C. and 90° C., between 45° C. and 80° C., between 50° C. and 80° C., between 55° C. and 80° C., and/or about 60° C.

According to various embodiments, the ambient air 540 may be altered in other ways in addition to having water vapor 550 added to form the controlled atmosphere 510. For example, oxygen may also be added to the ambient air 540 to form the controlled atmosphere 510. Added oxygen may increase the oxidation rate and allow a reduction in the oxidation cycle time.

According to various embodiments, the nominal flow rate of the controlled atmosphere 510 into the furnace 520 during the oxidation process is 125 cubic feet per hour per inch of furnace belt 500 width, with a minimum of 42 cubic feet per hour per inch of furnace belt 500 width and a maximum of 208 cubic feet per hour per inch of furnace belt 500 width. According to various embodiments, the controlled atmosphere 510 is fed into the furnace 520 during the oxidation process at at least 25, 35, 40, 50, 60, 70, 80, 90, and/or 100 cubic feet per hour per inch of furnace belt 500 width, and/or between 25 and 500, between 25 and 400, between 40 and 250 cubic feet per hour per inch of furnace belt 500 width. According to one or more embodiments, the furnace belt 500 is 18 inches wide. According to one or more embodiments, an array of 27 sintered interconnectors 320 are stacked 3×3×3 on ground alumina setter plates and then oxidized to form the final interconnectors 100. According to one or more alternative embodiments, the sintered interconnectors 320 are stacked 5 high and three across the mesh belt.

According to various embodiments, the desired humidification is accomplished using a humidifier 560 with an 8 lb./hour capacity to support a 1000 cubic feet per hour flow of the controlled atmosphere 510 into the furnace. According to One or more embodiments, the controlled atmosphere 510 is fed into the furnace 520 at a rate of at least 100, 250, 500, 750 cubic feet per hour (cfh), and/or between 100 and 5000 cfh, between 500 and 4000 cfh, and/or between 750 and 4000 cfh.

As shown in FIG. 9, after flowing into the furnace 520 and providing reaction gas for the oxidation step, the used controlled atmosphere 510 (less used reaction gas and other lost components) is exhausted from the furnace 520 as exhaust gas 580 where the belt 500 exits the furnace 520. According to various embodiments, the exhaust gas 580 may be recycled and re-injected (e.g., by re-humidifying the exhaust gas 580 to form the controlled atmosphere 510).

According to one or more embodiments, the manufacturing process results in the final interconnector 100 having a nitrogen content after the oxidation step of no more than 1.0%, 0.75%, 0.5%, 0.4%, 0.3%, 0.20%, 0.17%, 0.15%, 0.12%, 0.10%, and/or 0.09%. As shown in FIG. 8, after oxidation in the controlled atmosphere containing water vapour, the resulting nitrogen content is substantially reduced relative to the values observed after oxidation in ambient air (although ambient air may alternatively be used according to various embodiments). The measured nitrogen content is similar to that seen when oxidized in the nitrogen free argon/oxygen atmosphere. According to various embodiments, the oxidation process increases the nitrogen content of the interconnector by less than 0.1, 0.09, 0.08, 0.07, 0.06, 0.05 and/or 0.00 wt % of the final interconnector 100.

According to various embodiments, the oxidation step results in the formation of an oxide layer on the surface of the interconnector, wherein the oxide (e.g., chromium oxide, $Cr_2O_3$) is at least 1, 2, and/or 3 um thick and/or between 3 and 4 um thick.

According to various embodiments, the oxidizing step results in the final interconnector 100. According to various embodiments, the final interconnector 100 has an average flow field density of at least 6.63, 6.65, 6.67, 6.68, 6.69, 6.70, 6.71, 6.72, 6.73, and/or 6.71 glee, and/or less than 6.8, 6.78, 6.75, 6.74, 6.73, 6.72, and/or 6.71 g/cc. According to one or more embodiments, the final interconnector 100 has an average density within the flow field of about 6.7 glee. According to one or more embodiments, the final interconnector 100 is flat to within 400, 350, and/or 300 microns. According to various embodiments, an overall thickness of the interconnector plate 100 is between 1.5 min and 3.5 mm (depending on the embodiment), with a thickness variation of 0.25, 0.20, 0.19, and/or 0.180 microns maximum (not including in the depressions 130, 130').

According to various embodiments, the final interconnector 100 is subjected to further manufacturing steps (e.g., coatings, etc.) before being used in the SOFC stack 10.

While the above oxidation process is described with respect to particular interconnectors, the oxidation process may additionally or alternatively be used on a wide variety of other components without deviating from the scope of the present invention. For example, the above described oxidation process may be used with interconnectors made using other manufacturing techniques (e.g., interconnectors made using double-press manufacturing techniques). The oxidation process according to one or more embodiments of the present invention may be used to oxidize/passivate porous PM components (e.g., high chromium content PM components).

Conversely, while the interconnector manufacturing process is described as using various particular oxidation steps, the manufacturing method and resulting interconnectors 100 may alternatively be made using any other suitable steps (e.g., alternative oxidation steps, oxidation steps that utilize only ambient air as the atmosphere, methods that omit a formal oxidation step altogether, etc.).

According to various embodiments, iron particle size, chromium particle size, density, surface oxidation, and/or other aspects of the manufacturing process make the interconnector 100 impermeable to air from the cathode side 70 and fuel from the anode side 50. According to various embodiments, the final interconnector 100 thereby provides the dimensional accuracy, impermeability, and CTE that are suited for good function as an SOFC interconnector 100.

According to various embodiments, the final interconnector 100 consists essentially of chromium and iron. According to various embodiments, chromium and iron comprise at least 99.0, 99.5, 99.7, 99.8, 99.8, 99.9, and/or 99.99% of the interconnector 100.

As used herein, the term "impermeable to SOFC fuel and air" and similar terms means impermeability as that term is understood in the SOFC interconnector art. SOFC interconnector impermeability does not require absolute impermeability to fuel and air. Rather, "impermeable" merely requires the interconnector to be sufficiently impermeable to provide good function to an SOFC without failure over an extended period of time.

While embodiments of the invention have been described above with respect to SOFC interconnectors 100, embodiments of the invention may also be applied to other types of components. Various embodiments are particularly applicable to components in which a high density and/or impermeability is desired and/or components with complex finished shapes.

The foregoing illustrated embodiments are provided to illustrate the structural and functional principles of embodiments of the present invention and are not intended to be limiting. To the contrary, the principles of the present invention are intended to encompass any and all changes, alterations and/or substitutions within the spirit and scope of the following claims.

What is claimed is:

1. A method of manufacturing a porous, sintered SOFC interconnector comprising at least 20 weight % chromium, the method comprising:
   forming the porous, sintered SOFC interconnector using powder metallurgy, wherein said forming comprises compacting and sintering to form the porous, sintered SOFC interconnector having an air side comprising air passages, and a fuel side opposite the air side, the fuel side comprising fuel passages;
   oxidizing the porous, sintered SOFC interconnector in a furnace so as to expose the porous, sintered SOFC interconnector to an oxidation temperature range for a predetermined time period; and
   during said oxidizing, feeding a controlled atmosphere into the furnace such that the air and fuel sides of the SOFC interconnector are exposed to the controlled atmosphere during the oxidizing,
   wherein the controlled atmosphere comprises:
      at least 30 volume % nitrogen,
      at least 10 volume % oxygen, and
      at least 10 volume % water vapor,
   wherein said oxidizing increases a nitrogen content of the porous, sintered SOFC interconnector by less than 0.1 weight %,
   wherein said oxidizing seals the SOFC interconnector and results in the formation of an oxide layer comprising chromium oxide on a surface of the SOFC interconnector.

2. The method of claim 1, wherein said oxidizing results in the porous, sintered SOFC interconnector comprising less than 0.2 weight % nitrogen.

3. The method of claim 1, wherein said oxidizing results in the porous, sintered SOFC interconnector comprising less than 0.15 weight % nitrogen.

4. The method of claim 1, wherein the controlled atmosphere comprises at least 50 volume % ambient air.

5. The method of claim 1, wherein the controlled atmosphere comprises at least 20 volume % water vapor.

6. The method of claim 1, wherein the controlled atmosphere comprises between 10 and 30 volume % water vapor.

7. The method of claim 1, further comprising:
   adding water vapor to ambient air to create the controlled atmosphere.

8. The method of claim 1, wherein the oxidation temperature range is above 750° C. and the predetermined time period is at least 5 hours.

9. The method of claim 1, further comprising feeding the porous, sintered SOFC interconnector through the furnace in a travel direction during said oxidizing, wherein the controlled atmosphere is fed into the furnace in the travel direction.

10. The method of claim 1, further comprising feeding the porous, sintered SOFC interconnector through the furnace in a travel direction during said oxidizing, wherein the controlled atmosphere is fed into the furnace in an opposite direction as the travel direction.

11. The method of claim 1, wherein said oxidizing occurs prior to assembling the SOFC interconnector to an SOFC electrode.

12. The method of claim 1, wherein the method further comprises, after said oxidizing, assembling the SOFC interconnector to an SOFC electrode.

13. The method of claim 1, wherein said oxidizing occurs while the SOFC interconnector is separated from an SOFC electrode.

14. The method of claim 13, wherein the method further comprises, after said oxidizing, incorporating the SOFC interconnector into an SOFC that includes the SOFC electrode.

15. The method of claim 1, wherein the porous, sintered SOFC interconnector comprises at least 90 weight % chromium.

16. The method of claim 1, wherein the method further comprises, after said oxidizing, assembling the SOFC interconnector to an SOFC electrode so that the SOFC interconnector and the SOFC electrode directly face each other to form a passage therebetween.

17. The method of claim 1, wherein said sealing makes the SOFC interconnector impermeable to air and fuel.

18. The method of claim 1, wherein the oxide layer, which is formed during said oxidizing while feeding the controlled atmosphere into the furnace, is at least 1 um thick.

19. The method of claim 1, wherein the oxidation temperature is at least 600° C. for at least 10 hours of said oxidizing and said feeding of the controlled atmosphere occurs throughout the at least 10 hour time period.

20. The method of claim 1, wherein the air and fuel sides face away from each other in opposite directions.

21. A method of manufacturing a porous, sintered component comprising at least 20 weight % chromium, the method comprising:
   forming the porous, sintered component using powder metallurgy, wherein said forming comprises compacting and sintering to form the porous, sintered component having a first side opposite a second side;
   oxidizing the porous, sintered component in a furnace so as to expose the porous, sintered component to an oxidation temperature range for a predetermined time period; and
   during said oxidizing, feeding a controlled atmosphere into the furnace such that the first and second sides of the component are exposed to the controlled atmosphere during the oxidizing,
   wherein the controlled atmosphere comprises:
      at least 30 volume % nitrogen,
      at least 10 volume % oxygen, and
      at least 10 volume % water vapor, wherein said oxidizing increases a nitrogen content of the porous, sintered component by less than 0.1 weight %, wherein said oxidizing seals the component and results in the formation of an oxide layer comprising chromium oxide on a surface of the component, and wherein said feeding exposes all sides of the component to the controlled atmosphere during said oxidizing.

22. The method of claim 20, wherein said feeding exposes all sides of the interconnector to the controlled atmosphere during said oxidizing.

23. A method of manufacturing a porous, sintered component comprising at least 20 weight % chromium, the method comprising:

forming the porous, sintered component using powder metallurgy, wherein said forming comprises compacting and sintering to form the porous, sintered component having a first side and an opposite second side, wherein the first and second side face away from each other in opposite directions;

oxidizing the porous, sintered component in a furnace so as to expose the porous, sintered component to an oxidation temperature range for a predetermined time period; and during said oxidizing, feeding a controlled atmosphere into the furnace such that the first and second sides of the component are exposed to the controlled atmosphere during the oxidizing, wherein the controlled atmosphere comprises:
 at least 30 volume % nitrogen,
 at least 10 volume % oxygen, and
 at least 10 volume % water vapor, wherein said oxidizing increases a nitrogen content of the porous, sintered component by less than 0.1 weight %, wherein said oxidizing seals the component and results in the formation of an oxide layer comprising chromium oxide on a surface of the component.

\* \* \* \* \*